United States Patent
Kameya et al.

(10) Patent No.: US 6,683,774 B2
(45) Date of Patent: Jan. 27, 2004

(54) MONITORING SYSTEM FOR ELECTRICAL ANGLE CALCULATOR

(75) Inventors: Hisashi Kameya, Kariya (JP); Hideki Amakusa, Tokai (JP)

(73) Assignee: Denso Corporation, Kariya (JP)

( * ) Notice: Subject to any disclaimer, the term of this patent is extended or adjusted under 35 U.S.C. 154(b) by 102 days.

(21) Appl. No.: 10/143,017

(22) Filed: May 13, 2002

(65) Prior Publication Data

US 2002/0172509 A1 Nov. 21, 2002

(30) Foreign Application Priority Data

May 16, 2001 (JP) ........................................ 2001-146178

(51) Int. Cl.[7] .............................................. H01H 47/00
(52) U.S. Cl. ........................ 361/139; 361/51; 361/152; 318/139; 318/565
(58) Field of Search ........................... 361/139, 23, 51, 361/152; 318/430, 565, 564, 661, 139, 489; 340/686.3, 3.42; 324/207.25; 307/9.1, 10.1; 700/21, 56–59; 701/41–43; 388/909

(56) References Cited

U.S. PATENT DOCUMENTS

| | | |
|---|---|---|
| 5,135,066 A | 8/1992 | Kashihara |
| 5,448,480 A | 9/1995 | Rauner et al. |
| 5,506,776 A | 4/1996 | Fushimi et al. |
| 6,016,042 A * | 1/2000 | Miura et al. ................. 318/430 |
| 6,046,553 A * | 4/2000 | Matsunaga et al. ......... 318/139 |

FOREIGN PATENT DOCUMENTS

| | | |
|---|---|---|
| DE | 42 15 630 A1 | 12/1992 |
| JP | A 7-69231 | 3/1995 |

* cited by examiner

*Primary Examiner*—James Demakis
(74) *Attorney, Agent, or Firm*—Oliff & Berridge, PLC

(57) ABSTRACT

A monitoring system monitors a microcomputer in which an angle calculator calculates the electrical angle of a motor using output signals from a rotation angle sensor. In the microcomputer, a control signal generator generates a coded control signal that indicates the range to which the calculated electrical angle belongs. In the monitoring system, the electrical angle detected by the rotation angle sensor is multiplied by an excitation signal provided for the rotation angle sensor, and an angle detector detects the resultant signals. Based on the detected signals, a supervisory signal generator outputs a coded supervisory signal that indicates the range to which the electrical angle detected by the rotation angle sensor belongs. Then a fault detector determines that a failure occurs in the microcomputer, if a comparator determines that the coded control signal disagrees with the coded supervisory signal.

10 Claims, 3 Drawing Sheets

FIG. 2

| ELECTRICAL ANGLE | 0-45 | 45-90 | 90-135 | 135-180 | 180-225 | 225-270 | 270-315 | 315-360 |
|---|---|---|---|---|---|---|---|---|
| CODED SIGNAL | 0 | 1 | 2 | 3 | 4 | 5 | 6 | 7 |

FIG. 4

| ELECTRICAL ANGLE | CONDITION | CODED SIGNAL |
|---|---|---|
| 0-45 | SINout≧0 & COSout>0 & \|SINout\|<\|COSout\| | 0 |
| 45-90 | SINout>0 & COSout≧0 & \|SINout\|≧\|COSout\| | 1 |
| 90-135 | SINout>0 & COSout≦0 & \|SINout\|>\|COSout\| | 2 |
| 135-180 | SINout≧0 & COSout<0 & \|SINout\|≦\|COSout\| | 3 |
| 180-225 | SINout≦0 & COSout<0 & \|SINout\|<\|COSout\| | 4 |
| 225-270 | SINout<0 & COSout≦0 & \|SINout\|≧\|COSout\| | 5 |
| 270-315 | SINout<0 & COSout≧0 & \|SINout\|>\|COSout\| | 6 |
| 315-360 | SINout≦0 & COSout>0 & \|SINout\|≦\|COSout\| | 7 |

MONITORING SYSTEM FOR ELECTRICAL ANGLE CALCULATOR

CROSS REFERENCE TO RELATED APPLICATION

The present application is based on and incorporates herein by reference Japanese Patent Application No. 2001-146178 filed on May 16, 2001.

BACKGROUND OF THE INVENTION

1. Field of the Invention

The present invention relates to a monitoring system for a microcomputer which calculates the electrical angle of a rotator.

2. Related Art

The electric power steering system of a vehicle applies an assist current to a motor based on a torque signal received from a torque sensor. The torque signal indicates torque applied to the steering wheel. The motor is driven by the assist current so as to provide power assist for rotation of the steering wheel. Thereby the driver can steer the vehicle well.

The microcomputer of the electric power steering system includes an electrical angle calculator for calculating the electrical angle of the motor. The calculated electrical angle is fedback so as to be used for controlling the drive circuit for the motor. However, the microcomputer sometimes miscalculates the electrical angle due to the ambient temperature and/or noises. In this case, the amount of the assist current to be applied to the motor is controlled based on the inaccurate feedback electrical angle. As a result, the auxiliary steering force is supplied excessively or insufficiently. Then the driver cannot steer the vehicle well.

In order to overcome this problem, it is proposed that the power steering system includes a monitoring system for the electrical angle calculator. The monitoring system calculates the electrical angle of the motor independently, and then compares the calculated electrical angle with the electrical angle calculated by the electrical angle calculator. If the duration of the disagreement between the electrical angles reaches a predetermined length, it is determined that a failure occurs in the microcomputer. Then the motor is stopped and the microcomputer is stalled.

Two types of monitoring systems are proposed. One includes a supervisory circuit for monitoring a watchdog (WD) timer of the microcomputer from the outside. The other includes a supervisory microcomputer other than the microcomputer that controls the drive circuit for the motor, and thereby calculates the electrical angle of the motor redundantly. The failure in the microcomputer is detected by comparing the electrical angles calculated by the microcomputer and the supervisory microcomputer. In the case of the former monitoring system, the supervisory circuit cannot detect a failure in the microcomputer if the WD timer cannot detect the failure. In the case of the latter monitoring system, costs are high because the microcomputers should be redundantly prepared.

SUMMARY OF THE INVENTION

The present invention has an object to provide a simple and cost-effective monitoring system for detecting a failure in a microcomputer which calculates the electrical angle of a rotator.

A monitoring system according to the present invention includes a motor for driving a rotator, a rotation angle sensor for detecting the angle of the rotator, a microcomputer, supervisory signal generator means, comparator means and fault detector means. The microcomputer includes angle calculator means and control signal generator means. The angle calculator means calculates the angle of the rotator based on an excitation signal provided for the rotation angle sensor and an output signal from the rotation angle sensor. The control signal generator means generates an electrical control signal that indicates a first angle range to which the angle calculated by the angle calculator means belongs.

The supervisory signal generator means generates an electrical supervisory signal that indicates a second angle range to which the angle detected by the rotation angle sensor belongs based on an intermediate signal obtained as a result of multiplying the angle detected by the rotation angle sensor by an excitation signal provided for the rotation angle sensor. The comparator means compares the first angle range indicated by the control signal with the second angle range indicated by the supervisory signal. The fault detector means determines that a failure occurs in the microcomputer when the comparator means determines that the first angle range disagrees with the second angle range.

Preferably, the microcomputer is rebooted, when duration of the failure detected by the fault detector means exceeds a predetermined threshold. Thereafter the power is supplied to the motor if the fault detector means does not detect a failure in the microcomputer. Alternatively, power transmission to the motor may be stopped and the microcomputer may be stalled, when duration of the failure detected by the fault detector means exceeds the predetermined threshold.

BRIEF DESCRIPTION OF THE DRAWINGS

The above and other objects, features and advantages of the present invention will become more apparent from the following detailed description made with reference to the accompanying drawings. In the drawings:

FIG. 2 is a logical table used by the microcomputer for generating a coded control signal corresponding to the electrical angle calculated by the microcomputer based on output signals from a rotation angle sensor;

FIG. 4 is a logical table used by the monitoring system for generating the coded supervisory signal corresponding to the electrical angle based on the SIN and COS output signals.

DETAILED DESCRIPTION OF THE PREFERRED EMBODIMENT

Figure 1:
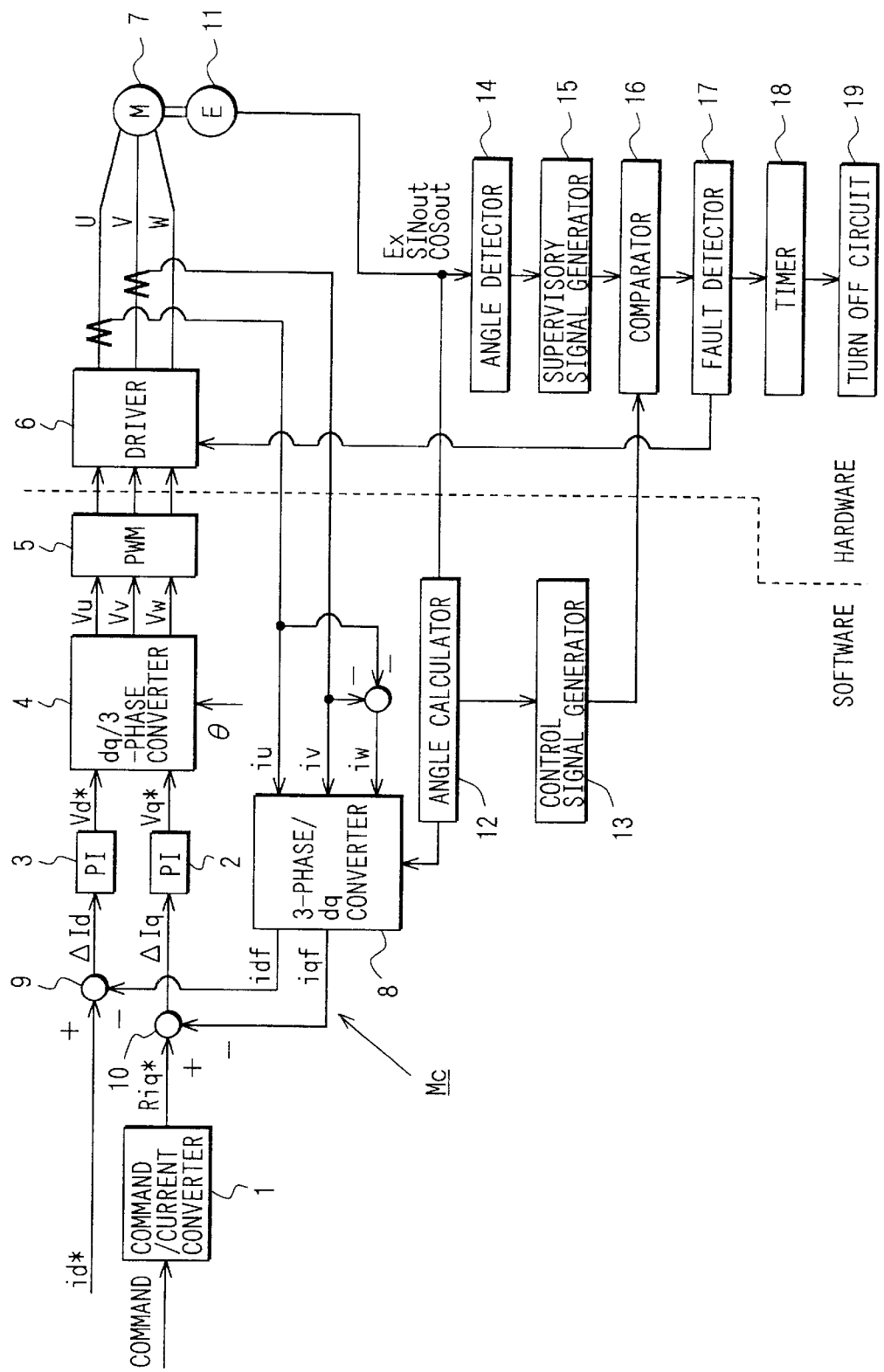
FIG. 1 is a block diagram showing a monitoring system according to an embodiment of the present invention incorporated in a power steering system and the other portions of the microcomputer of the power steering system.

A monitoring system according to an embodiment of the present invention is incorporated in the electric power steering system of a vehicle for monitoring a microcomputer of the power steering system. Referring to FIG. 1, the power steering system includes a brushless motor 7 for providing power assist for rotation of the steering wheel and a drive circuit 6 therefor, and further includes the microcomputer Mc for controlling the drive circuit 6. A rotation angle sensor (resolver) 11 is connected to the motor 7.

In the microcomputer Mc, a command signal is inputted to a command/current converter 1. The command signal is generated based on signals from a vehicle speed sensor and a torque sensor. The torque sensor detects the torque applied to the steering wheel.

The command/current converter 1 outputs a command current Riq*, which is applied to a dq/three-phase converter 4 as the q-axis component Vq* of a command voltage. On the other hand, a magnetizing current is applied to the dq/three-phase converter 4 as the d-axis component Vd* of the command voltage. The dq/three-phase converter 4 converts the command voltage that includes the q-axis component Vq* and the d-axis component Vd* into three-phase voltage Vu, Vv, Vw, which is applied to a pulse-width modulator (PWM) 5. The PWM 5 outputs pulse currents corresponding to the three-phase voltage Vu, Vv, Vw to the drive circuit 6. Then the drive circuit 6 applies assist currents to the motor 7 via three wires corresponding to the respective phases U, V, W.

The rotation angle sensor 11 receives an excitation signal Ex, and thereby detects the electrical angle of the motor 7. The angle calculator 12 calculates the electrical angle of the motor 7 based on the signals received from the rotation angle sensor 11. The electrical angle of the motor 7 is correlated with the actual rotation angle of the motor 7. The electrical angle calculator 12 outputs a feedback signal that indicates the calculated electrical angle to the dq/three-phase converter 4.

A three-phase/dq converter 8 receives the assist currents iu, iv, iw and converts them into the d-axis component idf and the q-axis component iqf, which are applied to a first comparator 9 and a second comparator 10, respectively. The first comparator 9 compares the d-axis component idf of the assist currents with the magnetizing current id*. If there is a difference between the d-axis component idf of the assist currents and the magnetizing current id* (i.e., $\Delta Id = |idf - id^*| \neq 0$), a first proportional plus integral (PI) controller 3 compensates the difference Aid by a proportional action and an integral action.

On the other hand, the second comparator 10 compares the q-axis component iqf of the assist currents with the command current Riq*. If there is a difference between the q-axis component iqf of the assist currents and the command current Rid* (i.e., $\Delta Iq = |iqf - Riq^*| \neq 0$), a second PI controller 4 compensates the difference $\Delta Iq$ by a proportional action and an integral action. Thus the assist currents are fedback as the d-axis component idf and the q-axis component iqf so as to be corrected.

The correction of the assist currents is repeated until the difference $\Delta Id$, $\Delta Iq$ vanishes. Thereafter the PWM 5 outputs the PWM signals generated based on the command values id*, Riq* and the feedback electrical angle signal θ, and then the drive circuit 6 drives the motor 7 based on the PWM signals. Thus the motor 7 assists the steering action with torque according to the vehicle speed and the torque applied to the steering wheel, which facilitates the driver's steering.

The monitoring system monitors the electrical angle calculated by the angle calculator 12 as follows. In the microcomputer Mc, a control signal generator 13 receives the signal that indicates the calculated electrical angle θ from the angle calculator 12, and outputs a coded control signal corresponding to the calculated electrical angle θ using a logical pattern shown in FIG. 2. According to the logical pattern, the entire range of the electrical angle is divided into eight ranges of 45 degrees, and the coded control signals corresponding to the respective ranges are 0, 1, 2, 3, 4, 5, 6, and 7.

Figure 3:
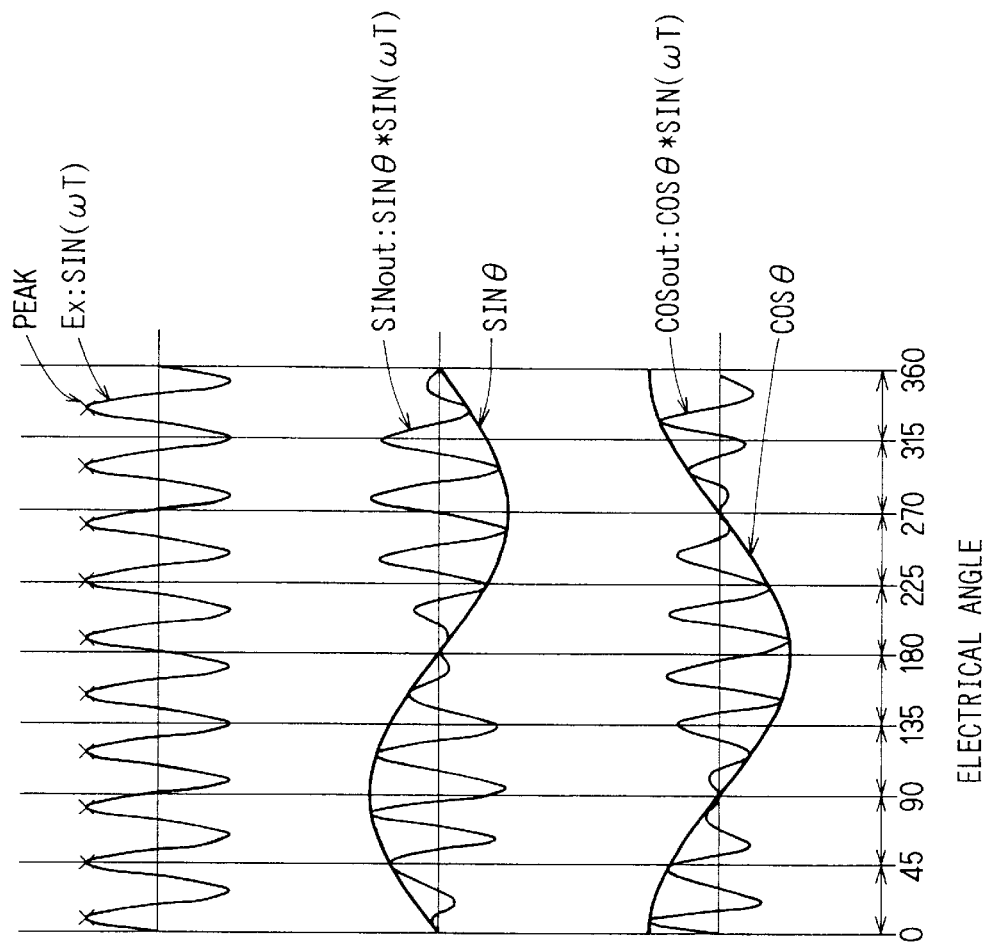
FIG. 3 is a graph showing how the monitoring system generates SIN and COS output signals used for generating a coded supervisory signal corresponding to the electrical angle detected by the rotation angle sensor.

On the other hand, referring to FIG. 3, the rotation angle sensor 11 receives the excitation signal $Ex = SIN(\omega T)$, and thereby detects the electrical angle of the motor 7 as described above. Further the rotation angle sensor 11 multiplies the SIN component SINθ and the COS component COSθ of the detected electrical angle by the excitation signal Ex into a SIN output signal $SIN_{out}$ and a COS output signal $COS_{out}$, where "θ" is the detected electrical angle of the motor 7 and expressed as:

$$\theta = TAN^{-1}(SIN_{out}/COS_{out})$$

The SIN output signal $SIN_{out}$ and the COS output signal $COS_{out}$ are calculated at times corresponding to the peaks of the excitation signal Ex. The SIN output signal $SIN_{out}$ and the COS output signal $COS_{out}$ corresponding to the peaks of the excitation signal Ex are expressed as:

$$SIN_{out} = SIN\theta * SIN(\omega T) = SIN\theta$$
$$COS_{out} = COS\theta * SIN(\omega T) = COS\theta$$

because the values of the excitation signal Ex corresponding to the peaks are "1".

The angle detector 14 detects the SIN output signal $SIN_{out}$ and the COS output signal $COS_{out}$. One cycle (i.e., 360 degrees) of the SIN output signal $SIN_{out}$ and the COS output signal $COS_{out}$ is also divided into eight ranges of 45 degrees, and coded supervisory signals corresponding to the respective ranges are 0, 1, 2, 3, 4, 5, 6, and 7. A supervisory signal generator 15 outputs a coded supervisory signal corresponding to the SIN output signal $SIN_{out}$ and the COS output signal $COS_{out}$ to a third comparator 16. The supervisory signal generator 15 generates the coded supervisory signal utilizing relations shown in FIG. 4.

For example, the electrical angle detected by the rotation angle sensor 11 is between 0 and 45 degrees if and only if the SIN output signal $SIN_{out}$ is equal to or larger than zero, the COS output signal $COS_{out}$ is larger than zero and the absolute value $|SIN_{out}|$ of the SIN output signal is less than the absolute value $|COS_{out}|$ of the COS output signal. Thus the coded supervisory signal is generated based on the magnitude relation between the SIN output signal $SIN_{out}$ and zero, the magnitude relation between the COS output signal $COS_{out}$ and zero, and the magnitude relation between the absolute value of the SIN output signal $SIN_{out}$ and the absolute value of the COS output signal $COS_{out}$.

When the electric power steering system is in action, the power is supplied to the motor 7, and the third comparator 16 compares the coded control signal from the control signal generator 13 with the coded supervisory signal from the supervisory signal generator 15 continuously. However, the third comparator 16 may compare the coded control signal with the coded supervisory signal at regular intervals. In this case, the computational load is reduced and consequently the possibility of miscalculation is reduced.

If the coded control signal disagrees with the coded supervisory signal, a fault detector 17 detects the miscalculation as an anomaly in the microcomputer. A timer 18 determines whether the duration of disagreement between the coded control signal and the coded supervisory signal exceeds a predetermined threshold.

If it is determined that the duration of the disagreement exceeds the predetermined threshold, the microcomputer Mc is rebooted. Thereafter, if the fault detector 17 does not detect an anomaly, the power is supplied to the motor 7. In this way, the operation of the microcomputer Mc is resumed when a transient malfunction occurs in the microcomputer Mc. That is, the microcomputer Mc is not stalled due to the transient malfunction.

Alternatively, the timer 18 may determine that the microcomputer Mc fails, if the fault detector 17 detects an anomaly and the duration of the anomaly exceeds the predetermined threshold. In this case, a turn off circuit 19 suppresses the power supply to the motor 7, and then the microcomputer Mc is stalled. Thus the microcomputer Mc is prevented from miscalculating the electrical angle again.

In this way, during a steering maneuver, the microcomputer Mc generates the coded control signal that indicates the range to which the electrical angle calculated by the microcomputer belongs. The monitoring system generates the coded supervisory signal that indicates the range to which the electrical angle detected by the rotation angle sensor 11 belongs based on the SIN and COS output signals $SIN_{out}$, $COS_{out}$ obtained as a result of multiplying the electrical angle detected by the rotation angle sensor 11 by the excitation signal Ex. Then the coded control signal is compared with the coded supervisory signal. Thus, by utilizing the SIN and COS output signals $SIN_{out}$, $COS_{out}$, the monitoring system can detect the miscalculation readily and certainly.

The monitoring system according to the present invention is simple and inexpensive, and therefore practical in comparison with a monitoring system that employs a redundant microcomputer. The third comparator corresponds to comparator means of the present invention, and the SIN and COS output signals $SIN_{out}$, $COS_{out}$ correspond to an intermediate signal of the present invention.

According to the present embodiment, the present monitoring system is incorporated in the electric power steering system of the vehicle. However, the monitoring system may be incorporated in a system other than the electric power steering system. For example, the present monitoring system may be used for monitoring the calculated electrical angle of the motor for driving the blades of the air blower of an air conditioner, the blades of a wind power generator, or the equatorial mounting of an astronomical telescope.

The present invention is not limited to the above embodiment and modifications, but may be variously embodied within the scope of the invention.

What is claimed is:

1. A monitoring system for a microcomputer that calculates an angle of a rotator, comprising:
   a motor for driving said rotator;
   a rotation angle sensor for detecting an angle of said rotator;
   said microcomputer which includes:
      angle calculator means for calculating the angle of said rotator based on an excitation signal provided for said rotation angle sensor and an output signal from said rotation angle sensor; and
      control signal generator means for generating an electrical control signal that indicates a first angle range to which the angle calculated by said angle calculator means belongs;
   supervisory signal generator means for generating an electrical supervisory signal that indicates a second angle range to which the angle detected by said rotation angle sensor belongs based on an intermediate signal obtained as a result of multiplying the angle detected by said rotation angle sensor by the excitation signal provided for said rotation angle sensor;
   comparator means for comparing the first angle range indicated by said control signal with the second angle range indicated by said supervisory signal; and
   fault detector means for determining that a failure occurs in said microcomputer when said comparator means determines that the first angle range disagrees with the second angle range.

2. A monitoring system as in claim 1, wherein said comparator means compares the first and second angle ranges at constant time intervals.

3. A monitoring system as in claim 1, wherein said supervisory signal generator uses a peak value of said intermediate signal for generating said supervisory signal.

4. A monitoring system as in claim 1, wherein:
   said microcomputer is rebooted, when duration of the failure detected by said fault detector means exceeds a predetermined threshold; and
   power is supplied to said motor if said fault detector means does not detect a failure in said microcomputer.

5. A monitoring system as in claim 1, wherein power transmission to said motor is stopped and said microcomputer is stalled, when duration of the failure detected by said fault detector means exceeds a predetermined threshold.

6. A method for monitoring a microcomputer that calculates an angle of an electronically controlled rotator, the method comprising the steps of:
   (a) a motor driving said rotator;
   (b) a rotation angle sensor detecting an angle of said rotator;
   (c) said microcomputer calculating the angle of said rotator based on an excitation signal provided for said rotation angle sensor and an output signal from said rotation angle sensor;
   (d) said microcomputer generating an electrical control signal that indicates a first angle range to which the angle calculated by said angle calculator means belongs;
   (e) multiplying the angle detected by said rotation angle sensor by the excitation signal provided for said rotation angle sensor into an intermediate signal;
   (f) generating an electrical supervisory signal that indicates a second angle range to which the angle detected by said rotation angle sensor belongs based on said intermediate signal obtained at said multiplying step;
   (g) comparing the first angle range indicated by said control signal with the second angle range indicated by said supervisory signal; and
   (h) determining that a failure occurs in said microcomputer when it is determined that the first angle range disagrees with the second angle range at said comparing step.

7. A method as in claim 6, wherein said comparing step (g) is performed at constant time intervals.

8. A method as in claim 6, wherein said generating step (f) uses, for generating said supervisory signal, a peak value of said intermediate signal obtained at said multiplying step.

9. A method as in claim 6 further comprising the steps of:
   rebooting said microcomputer if duration of the failure detected at said determining step (h) exceeds a predetermined threshold; and
   supplying power to said motor if a failure in said microcomputer is not detected as a result of performing steps (b)–(h).

10. A method as in claim 6 further comprising the steps of:
    stopping power transmission to said motor, if duration of the failure detected at said determining step (h) exceeds a predetermined threshold; and
    stalling said microcomputer, if duration of the failure detected at said determining step (h) exceeds the predetermined threshold.

* * * * *